United States Patent [19]
Min

[11] Patent Number: 5,708,524
[45] Date of Patent: Jan. 13, 1998

[54] ARRAY OF ELECTRICALLY INDEPENDENT THIN FILM ACTUATED MIRRORS

[75] Inventor: Yong-Ki Min, Seoul, Rep. of Korea

[73] Assignee: Daewoo Electronics Co.,Ltd., Seoul, Rep. of Korea

[21] Appl. No.: 642,710

[22] Filed: May 3, 1996

[30] Foreign Application Priority Data

May 26, 1995 [KR] Rep. of Korea .......... 95-13359

[51] Int. Cl.$^6$ .................. G02B 26/00
[52] U.S. Cl. .......... 359/290; 359/291; 359/295; 359/846; 310/328
[58] Field of Search .......... 359/290, 291, 359/295, 221, 846, 855; 310/328, 366

[56] References Cited

U.S. PATENT DOCUMENTS

| 5,022,745 | 6/1991 | Zayhowski et al. | 359/846 |
| 5,085,497 | 2/1992 | Um et al. | 359/855 |
| 5,172,262 | 12/1992 | Hornbeck | 359/291 |
| 5,175,465 | 12/1992 | Um et al. | 310/328 |
| 5,550,680 | 8/1996 | Yoon | 359/295 |

Primary Examiner—Loha Ben
Attorney, Agent, or Firm—Anderson Kill & Olick, P.C.

[57] ABSTRACT

An array of M×N thin film actuated mirrors includes an active matrix including a substrate with an array of M×N pairs of connecting terminals and an array of M×N transistors, and an array of M×N actuating structures, each of the actuating structures having an actuating and a light reflecting portions, wherein the actuating portion further includes a first and a second parts. Each of the actuating structures is provided with a first thin film electrode, a thin film electrodisplacive member, a second thin film electrode, an elastic member and a first and a second conduits. Since the first thin film electrode in the first part is electrically connected individually to the bias source, and the second thin film electrode is electrically connected individually to one of the transistor, each of the actuating structures is electrically disconnected with other actuating structures in the same row or column in the array, thereby allowing the bias signal and the electric signal to be applied individually to each of the thin film actuated mirrors.

6 Claims, 3 Drawing Sheets

5,708,524

ARRAY OF ELECTRICALLY INDEPENDENT THIN FILM ACTUATED MIRRORS

FIELD OF THE INVENTION

The present invention relates to an optical projection system; and, more particularly, to an array of M×N thin film actuated mirrors for use in the system.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIG. 1, there is shown a cross sectional view of an array 100 of M×N thin film actuated mirrors 101 for use in an optical projection system, disclosed in a copending commonly owned application, U.S. Ser. No. 08/331,399, entitled "THIN FILM ACTUATED MIRROR ARRAY AND METHOD FOR THE MANUFACTURE THEREOF", comprising an active matrix 10, an array 90 of M×N actuating structures 95, an array 20 of M×M supporting members 22 and an array 70 of M×N mirrors 75.

The active matrix 10 includes a substrate 12, an array of M×N transistors (not shown) and an array 13 of M×N connecting terminals 14. Each of the actuating structures 95 in the array 100 is provided with at least a thin film layer 55 of an electrodisplacive material such as a piezoelectric material, e.g., lead zirconium titanate (PZT) or an electrostrictive material, e.g., lead magnesium niobate (PMN), a first thin film electrode 65, a second thin film electrode 45 and an elastic member 35 made of a ceramic, wherein the first and the second thin film electrodes 65, 45 are placed on top and bottom of the thin film electrodisplacive member 55, and the elastic member 35 is placed on bottom of the second thin film electrode 45, respectively. The first thin film electrode 65 functions as a common bias electrode in the thin film actuated mirrors, and the second thin film electrode 45 functions as a signal electrode in each of the thin film actuated mirrors 101. Each of the supporting members 22 is used for holding each of the actuating structures 95 in place by cantilevering each of the actuating structures 95 and for electrically connecting the second thin film electrode 45 in each of the actuating structures 95 and each of the connecting terminals 14 in the active matrix 10 by being provided with a conduit 24 made of a metal, e.g., tungsten (W). Furthermore, each of the mirrors 75, made of a light reflecting material, e.g., aluminum (Al), is placed on top of each of the actuating structures 95.

In the array 100 of the thin film actuated mirrors 101, an electric signal is applied across the thin film electrodisplacive member 55 located between the first and the second thin film electrodes 65, 45 in each of the actuating structures 95, causing a deformation thereof, which will, in turn, deform the mirror 75 placed on top thereof, thereby changing the optical path of the incident light beam.

There are certain deficiencies associated with the above described array 100 of the thin film actuated mirrors 111. Since the first thin film electrode 65 in each of the actuating structures 95 is interconnected with other first thin film electrodes (not shown) in the same row or column in the array 100, if one of the actuating structures 95 becomes inoperable for any reason, e.g., short-circuit, all of the other actuating structures 95 in the same row or column in the array 100 become inoperable.

SUMMARY OF THE INVENTION

It is, therefore, a primary object of the present invention to provide an array of M×N thin film actuated mirrors for use in an optical projection system, wherein a first thin film electrode in each one of the thin film actuated mirrors is separated from other first thin film electrodes in any of the other actuated mirrors in the same row or column of the array, thereby allowing a bias signal to be applied individually to each of the thin film actuated mirrors.

In accordance with one aspect of the present invention, there is provided an array of M×N thin film actuated mirrors, wherein M and N are integers, for use in an optical projection system, each of the thin film actuated mirrors capable of causing a deviation in the optical path of an incident light beam, the array comprising: an active matrix including a substrate with an array of M×N pairs of connecting terminals and an array of M×N transistors, wherein one of the connecting terminals in each pair is individually connected to a bias source, and the remaining connecting terminal in each pair is electrically connected to one of the transistors in the array, the transistor being used for providing an electric signal to each of the thin film actuated mirrors; and an array of M×N actuating structures, each of the actuating structures including a first thin film electrode, a thin film electrodisplacive member, a second thin film electrode, an elastic member and a first and a second conduits, the first thin film electrode being formed on top of the thin film electrodisplacive member, the thin film electrodisplacive member being formed on top of the second thin film electrode, the second thin film electrode being formed on top of the elastic member, each of the actuating structures being provided with an actuating and a light reflecting portions, the actuating portion further having a first and a second parts, the first and the second parts being used as routes for receiving a bias signal and an electric signal, respectively, wherein the second thin film electrode has a stripe, the stripe isolating electrically a portion of the second thin film electrode in the first part of the actuating portion from the rest thereof, the first part of the actuating portion being shaped such that the electrically isolated portion of the second thin film electrode in the first part is in contact with the first thin film electrode, the electrically isolated portion being further connected electrically to the connecting terminal connected electrically to the bias source through the first conduit, thereby allowing the first thin film electrode to function as a mirror and a bias electrode, and the second thin film electrode in the second part is electrically connected to the connecting terminal connected electrically connected to the transistor through the second conduit, thereby functioning as a signal electrode.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENT

Figure 1:
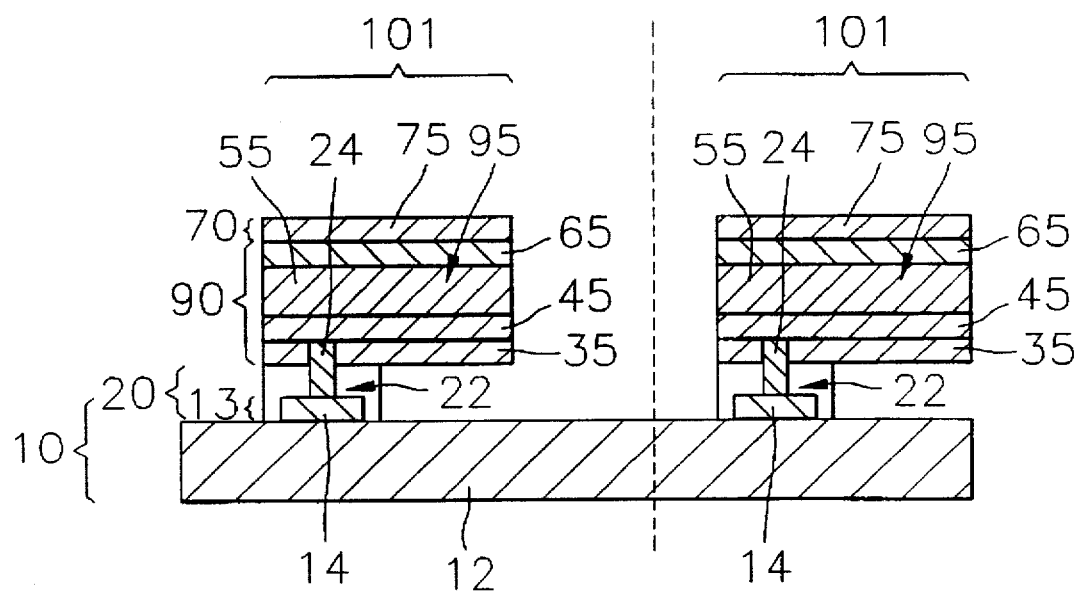
FIG. 1 is a cross sectional view of an array of M×N thin film actuated mirrors previously disclosed.
Figure 2:
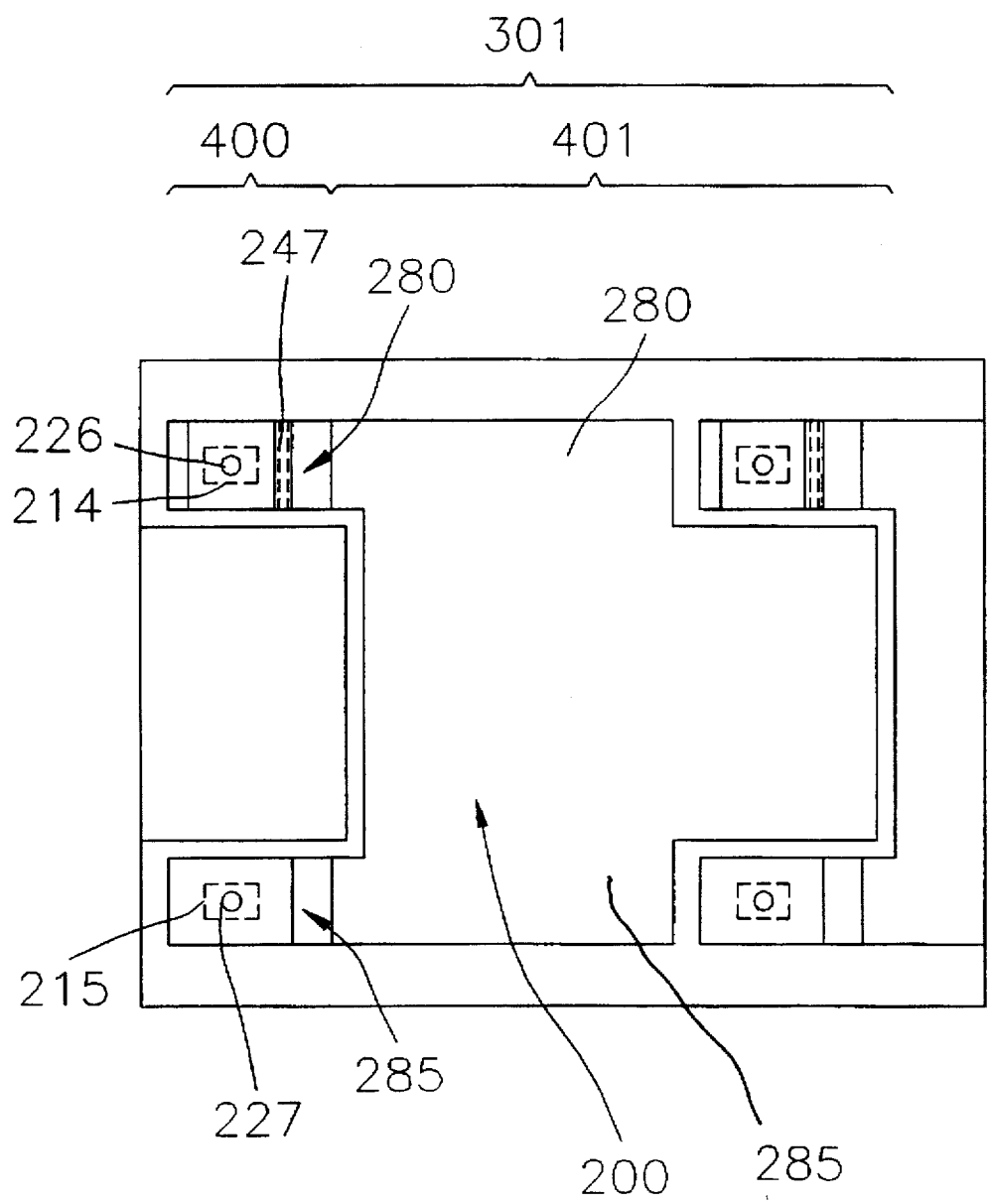
FIG. 2 is a top view of an array of M×N thin film actuated mirrors in accordance with the present invention.
Figure 3A:
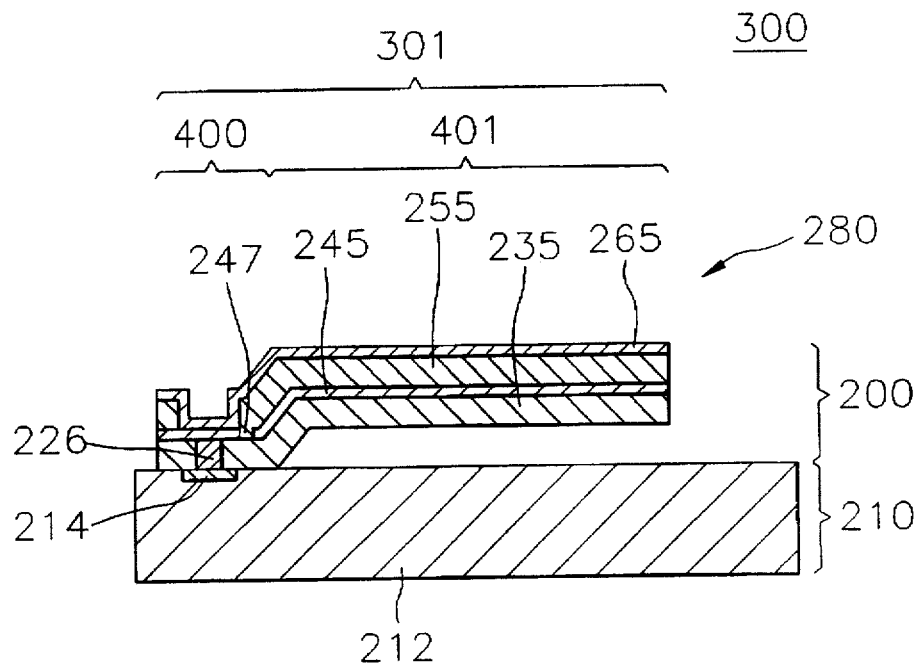
FIGS. 3A and 3B are cross sectional views setting forth the array of M×N thin film actuated mirrors shown in FIG. 2.
Figure 3B:
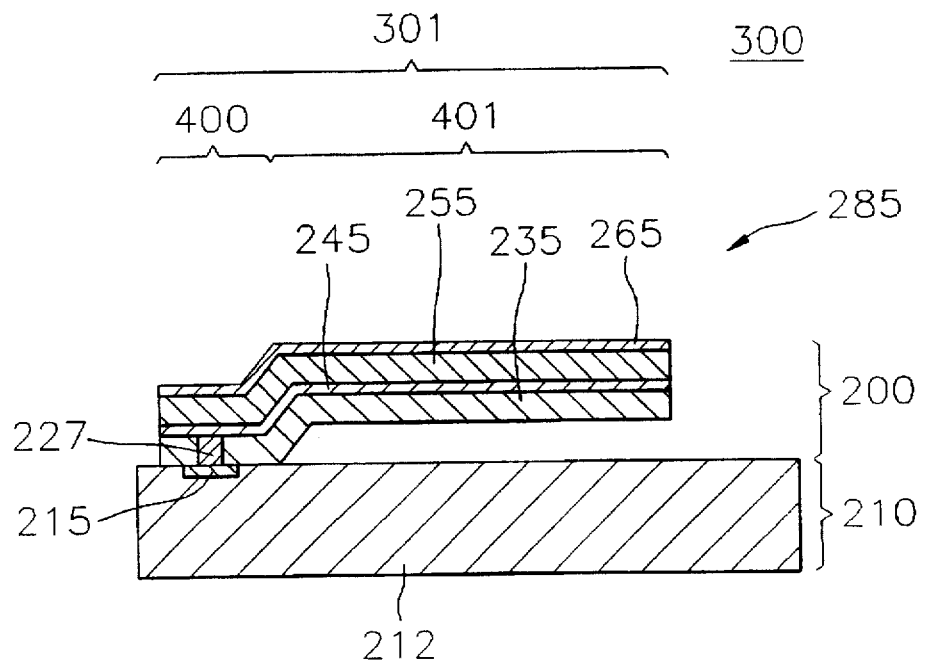

There are provided in FIGS. 2, 3A and 3B a top view and a pair of cross sectional views of an array 300 of M×N thin film actuated mirrors 301, wherein M and N are integers, for use in an optical projection system in accordance with the present invention, respectively. It should be noted that like parts appearing in FIGS. 2 and 3A to 3B are represented by like reference numerals.

In FIG. 2, there is provided a top view of the inventive array 300 of M×N thin film actuated mirrors 301, the array 300 comprising an active matrix 210 and an array of M×N actuating structures 200.

The active matrix 210 includes a substrate 212 made of an insulating material and having an array of M×N pairs of connecting terminals 214, 215 and an array of M×N transistors (not shown), wherein the connecting terminal 214 in each pair is individually connected electrically to a bias source (not shown), and the remaining connecting terminal 215 in each pair is electrically connected to one of the transistors in the array, the transistor being used for providing an electric signal to each of the actuating structures 200.

Each of the actuating structures 200 is provided with an actuating and a light reflecting portions 400, 401, wherein the actuating portion 400 has a first and a second parts 280, 285, the first and the second parts 280, 285 being used as routes for receiving a bias signal and the electric signal, respectively.

In FIGS. 3A and 3B, there are provided cross sectional views setting forth the first and the second parts 280, 285 of each of the thin film actuated mirrors 301 shown in FIG. 2, respectively.

Each of the actuating structures 200 includes a first thin film electrode 265 made of an electrically conducting and light reflecting material, a thin film electrodisplacive member 255 made of a piezoelectric or an electrostrictive material, a second thin film electrode 245 made of an electrically conducting material, an elastic member 235 made of an insulating material and a first and a second conduits 226, 227 made of a metal. In each of the actuating structures 200, the first thin film electrode 265 is formed on top of the thin film electrodisplacive member 255, the thin film electrodisplacive member 255 is, in turn, formed on top of the second thin film electrode 245, and the second thin film electrode 245 is formed on top of the elastic member 235. A stripe 247 is formed on the second thin film electrode 245 in such a way that it isolates electrically a portion of the second thin film electrode 245 in the first part 280 of the actuating portion 400 from the rest thereof. Further, each of the actuating structures 200 is shaped such that the first thin film electrode 265 in the first part 280 is in an electrical contact with the electrically isolated portion of the second thin film electrode 245 in the first part 280 of the actuating portion 400 which, in turn, is electrically connected to the bias source through the first conduit 226 and the connecting terminal 214 in the pair connected to the bias source, thereby allowing the first thin film electrode 265 to function as a mirror and a bias electrode. The rest of the second thin film electrode 245 is electrically connected to the connecting terminal 215 connected electrically to the transistor through the second conduit 227, thereby allowing it to function as a signal electrode.

In the inventive array 300 of M×N thin film actuated mirrors 301, since the first thin film electrode 265 is electrically connected individually to the bias signal source through the connecting terminal 214, the first conduit 226 and the electrically isolated portion of the second thin film electrode 245 in the actuating portion 400, and the second thin film electrode 245 is electrically connected individually to one of the transistor through the connecting terminal 215 and the second conduit 227 in the actuating portion 400, each of the actuating structures 200 is electrically disconnected with other actuating structures 200 in the same row or column in the array 300, thereby allowing the bias signal and the electric signal to be applied individually to each of the thin film actuated mirrors 301. In the inventive array 300, even if one of the actuating structures 200 becomes inoperable for any reason, e.g., short-circuit, all of the other actuating structures 200 in the same row or column in the array 300 are not affected by it.

While the present invention has been described with respect to certain preferred embodiments only, other modifications and variations may be made without departing from the scope of the present invention as set forth in the following claims.

What is claimed is:

1. An array of M×N thin film actuated mirrors, wherein M and N are integers, for use in an optical projection system, each of the thin film actuated mirrors capable of causing a deviation in the optical path of an incident light beam, the array comprising:

an active matrix including a substrate with an array of M×N pairs of connecting terminals and an array of M×N transistors, wherein one of the connecting terminals in each pair is individually connected to a bias source, and the remaining connecting terminal in each pair is electrically connected to one of the transistors in the array, the transistor being used for providing an electric signal to each of the thin film actuated mirrors; and an array of M×N actuating structures, each of the actuating structures including a first thin film electrode, a thin film electrodisplacive member, a second thin film electrode, an elastic member and a first and a second conduits, the first thin film electrode being formed on top of the thin film electrodisplacive member, the thin film electrodisplacive member being formed on top of the second thin film electrode, the second thin film electrode being formed on top of the elastic member, each of the actuating structures being provided with an actuating and a light reflecting portions, the actuating portion further having a first and a second parts, the first and the second parts being used as routes for receiving a bias signal and an electric signal, respectively, wherein the second thin film electrode has a stripe, the stripe isolating electrically a portion of the second thin film electrode in the first part of the actuating portion from the rest thereof, the first part of the actuating portion being shaped such that the electrically isolated portion of the second thin film electrode in the first part is in contact with the first thin film electrode, the electrically isolated portion being further connected electrically to the connecting terminal connected electrically to the bias source through the first conduit, thereby allowing the first thin film electrode to function as a mirror and a bias electrode, and the second thin film electrode in the second part is electrically connected to the connecting terminal electrically connected to the transistor through the second conduit, thereby functioning as a signal electrode.

2. The array of claim 1, wherein the first thin film electrode is made of an electrically conducting and light reflecting material.

3. The array of claim 1, wherein the second thin film electrode is made of an electrically conducting material.

4. The array of claim 1, wherein the thin film electrodisplacive member is made of a piezoelectric or an electrostrictive material.

5. The array of claim 1, wherein the elastic member is made of an insulating material.

6. The array of claim 1, wherein the first and the second conduits are made of a metal.

* * * * *